March 26, 1957  C. H. LEWIS  2,786,881
VENT PLUG STRUCTURE
Filed Sept. 9, 1955

INVENTOR.
CLARK H. LEWIS
BY
Christie, Parker & Hale
ATTORNEYS

United States Patent Office 2,786,881
Patented Mar. 26, 1957

2,786,881

VENT PLUG STRUCTURE

Clark H. Lewis, Pasadena, Calif.

Application September 9, 1955, Serial No. 533,273

2 Claims. (Cl. 136—177)

This invention relates to vent plugs or caps for the cell openings in storage batteries, and it has particular reference to vent plug structure for simultaneously opening or closing a plurality of the cell openings of a battery.

Probably the most common cause of premature failure in wet cell storage batteries is the lack of inspection, or of adequate inspection, of the fluid level in the battery cells resulting in failure to maintain sufficient fluid in the cells.

Premature battery failure places a burden upon battery manufacturers in relation to their warranty or guarantee on batteries. Accordingly, manufacturers have expended considerable effort toward making batteries which requires the addition of fluid at less frequent intervals and toward informing battery users of the importance of proper inspection.

While the efforts of manufacturers have been fruitful, the overall problem remains substantially unsolved. Perhaps this is best illustrated by example. When a motorist has his vehicle serviced, he may be thoughtful enough to ask that his battery be checked. The servicing attendant may then proceed to unscrew the several battery caps and inspect each cell of the battery for proper fluid level. However, the attendant is just as likely to unscrew only one of the caps and check the fluid level in only one of the battery cells, which practice is not uncommon and is probably founded upon to the premise that since batteries require the addition of fluid at infrequent intervals, an inspection of one cell will probably be indicative of all the cells of the battery. Thus, the attendant takes a chance at the owner's expense and avoids the trouble of unscrewing each of the several battery caps to inspect all the cells.

The present invention provides a vent plug structure wherein a plurality of members are structurally interconnected so that they are all removed or set in place over the cell openings of the battery simultaneously. The invention eliminates the trouble of unscrewing several battery caps, and discourages inadequate inspection by exposing a plurality of cells at once.

Accordingly, the vent plug structure of the invention includes a plurality of members for covering the cell openings of the battery, means structurally interconnecting the members with one another, and means for releasably securing the interconnected members over the cell openings of the battery.

In a preferred embodiment, a plurality of plug members are connected to a mounting member at spaced locations along the length of the mounting member in accordance with the spacing between the cell openings of the battery. The plug members depend from beneath the mounting member, and each of the plug members has a resilient portion substantially conical in shape for seating in one of the cell openings of the battery. A plurality of spring members extend laterally from the mounting member, and each of these spring members has a hook portion at its outer end adapted to hook around the outer edge of a cell connector of the battery. The spring members have a convex curvature so that by pushing the vent plug structure down onto the battery, the spring members are bent outwardly until the hook portions snap over the outer edges of the cell connectors of the battery, thereby coupling the mounting member to the battery so that said resilient portions of the plug members are collectively secured in the respective cell openings of the battery.

Each of the hook portions has a rocker surface which rests on the top surface of the corresponding cell connector of the battery when the vent plug structure is coupled in place on the battery. The rocker surface in cooperation with the convex curvature of the associated spring members assists in detaching the vent plug structure from the battery, which detachment is accomplished by pushing downwardly on a spring member thereby producing a rocking action which rocks the hook portion out of engagement with the associated cell connectors.

When coupled into position on the battery, the spring members provide a physical restraint for securing the plug members in the cell openings of the battery. Further, the distortion of the natural curvature of the spring members produced when the vent plug structure is coupled to the battery causes the spring members to exert spring pressure which urges the plug members toward the cell openings.

Accordingly, resilient portions of the plug members are snugly seated in the cell openings thereby eliminating the necessity of providing threads on the plug members and screwing them into the openings. It should be noted that present batteries outfitted with threaded cell openings need not be modified to accommodate the use of the present invention since the plug members will fit in both smooth or threaded openings because of the resiliency and conical shape of the resilient portion of each plug.

The plug members are preferably made from a resilient material such as rubber. Further, if the spring members and portions that hook around the cell connectors of the battery are conductive, the mounting member should be fabricated of a non-conducting material in order to prevent shorting between the cell connectors of the battery.

These and other aspects of the invention will become more apparent with reference to the following detailed description of structural elements embodying the invention in conjunction with the accompanying drawings in which.

Figure 1:
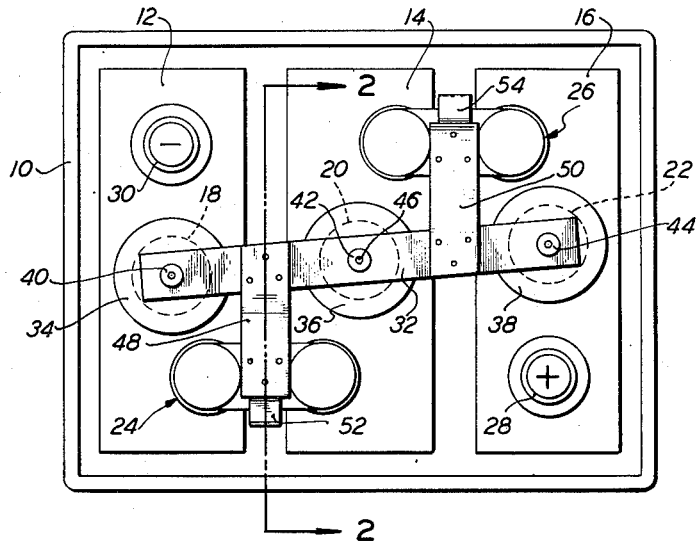
Fig. 1 is a plan view of the preferred embodiment of the invention coupled in place on a conventional three-cell storage battery.

With reference to Fig. 1, a conventional six volt wet cell storage battery includes a housing 10 which contains three wet cells 12, 14, 16, the cells having openings 18, 20, 22 respectively. The cells are connected in electrical series by a pair of cell connectors 24, 26, with the terminal posts of the battery being shown at 28 and 30.

The preferred embodiment of the invention includes a mounting member 32 of non-conductive material substantially in the form of an elongated plate or bar. Three plug members 34, 36, 38 depend from beneath the mounting member at spaced locations along the length of the mounting member in accordance with the distance between cell openings of the battery. The plug members 34, 36, 38 are connected to the mounting member by short rods 40, 42, 44. The rods are flared out on each end and each rod has an opening, such as shown at 46 for the rod 42, which extends longitudinally through it for ventilating the cell when the plug is seated in the cell opening.

A pair of leaf spring members 48, 50 are connected to the mounting member so that they extend laterally therefrom. Each of the spring members has a hook portion as shown at 52, 54 respectively connected on its end for engaging a cell connector of the battery.

Figure 2:
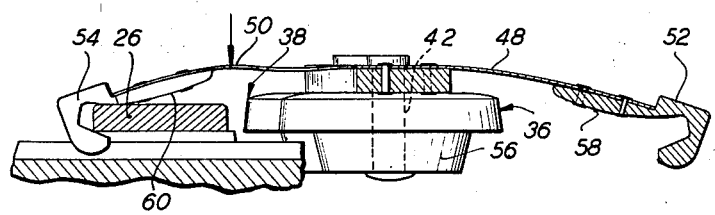
Fig. 2 is an elevation taken along line 2—2 of Fig. 1 with portions of the battery broken away.

Referring now to Fig. 2, each plug member has a resilient portion substantially conical in shape such as typically shown at 56 for the plug member 36, the conical portions of the several plug members being adapted to seat in the cell openings in the battery with the resiliency and the conical shape providing a tight fit.

Each of the spring members has a convex curvature so that it curves downwardly from the mounting member. The hook portions 52, 54 on the ends of the spring members 48, 50 have rounded lower or rocker surfaces 58, 60.

To attach the vent plug structure of the invention to a battery, the plug members are aligned with the cell openings of the battery with the hook portions on the spring members disposed against the top surface of the respective cell connectors of the battery, and then the vent plug structure is pushed downwardly causing the leaf springs to bend outwardly and the hook portions to ride along the top surface of the respective cell connectors until the hook portions snap over and hook around the outer edges of the respective cell connectors. When coupled in position in this manner, the leaf springs exert a downward force upon the support member and thereby spring load the plug members into the cell openings in addition to providing a physical restraint to complete removal of the plug members from the cells.

To detach the vent plug structure of the invention from the battery a downward push is exerted on one or both of the spring members, such as shown by the arrow in Fig. 2, causing the hook portions to rock out of contact with the cell connectors. This rocking action is attributable to the rocker surfaces 58, 60 of the respective hook portions in cooperation with the convex curvature of the leaf springs.

At the present time six-cell, twelve-volt storage batteries are coming into more extensive use. A schematic plan view of such a twelve-volt storage battery appears in Fig. 3. As with the three-cell battery, the twelve-volt or six-cell battery commonly includes a pair of cell connectors 62, 64. The cell openings are ordinarily arranged in pairs as shown at 66, 68, 70 for the six cells of the battery.

Figure 3:
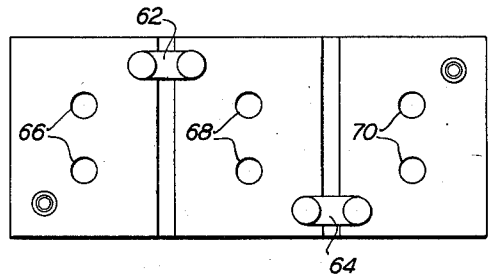
Fig. 3 is a schematic plan view of a conventional six-cell storage battery.
Figure 4:
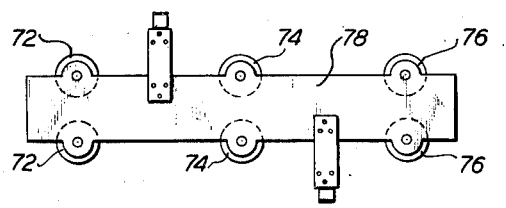
Fig. 4 is a plan view of an embodiment of the invention adapted to be used on the six-cell battery of Fig. 3.

Accordingly the vent plug structure of the invention may be adapted, as shown at Fig. 4, to include plug members arranged in pairs as shown at 72, 74, 76 on a mounting member 78. The attachment and detachment of the vent plug structure of Fig. 4 on the six-cell battery of Fig. 3 is the same as discussed above with reference to the three-cell battery.

It is notable that with the embodiments of the invention shown in the drawings, the vent plug structure is relatively flat and does not extend upwardly from the battery beyond the extent of the terminal posts, and therefore it does not interfere with the use of conventional packaging for batteries or with the use of conventional battery cover plates or containers.

It is to be understood that the plug members shown in the drawings represent preferred structure and that, if desired, different kinds of plug members or caps could be provided. Further, these plugs or caps may be threaded so that they may be screwed into the cell openings of the battery while retaining their common interconnection through the mounting member, which structure would still bear the desirable requirement that to remove one battery cap, all must be removed. Such a modified structure would require that the plug members be rotatably connected to the mounting member, and although the caps themselves would serve as means for releasably coupling the structure to the battery, attachment and detachment of the structure would require about the same amount of screwing and unscrewing operations as is presently required with conventional battery caps.

I claim:

1. Vent plug structure for storage batteries comprising a mounting member, a plurality of plug members depending from beneath the mounting member at spaced locations along the length of the mounting member in accordance with the spacing between the cell openings of the battery, each of the plug members having a resilient portion substantially conical in shape for seating in one of the cell openings of the battery, a plurality of spring members extending laterally from the mounting member, each of the spring members having a hook portion at its end adapted to engage the outer edge of a cell connector of the battery for coupling the mounting member to the battery so that said resilient portions of the plug members are collectively secured in the respective cell openings of the battery, and each of the spring members having a convex curvature so that by pushing the vent plug structure down onto the battery the respective spring members are bent outwardly until the hook portions snap over the outer edges of the cell connectors.

2. Apparatus of claim 1 wherein each hook portion has a rocker surface which rests on the top surface of the corresponding cell connector of the battery when the vent plug structure is coupled in place on the battery, the rocker surface cooperating with the convex curvature of the associated spring member so that pushing downwardly on the spring member produces a rocking action which moves the hook portion out of contact with the outer edges of the cell connector.

References Cited in the file of this patent

UNITED STATES PATENTS

| | | |
|---|---|---|
| 2,281,800 | Riedesel | May 5, 1942 |
| 2,570,123 | Heine | Oct. 2, 1951 |
| 2,629,760 | Wells et al. | Feb. 24, 1953 |